United States Patent Office 2,956,149
Patented Oct. 11, 1960

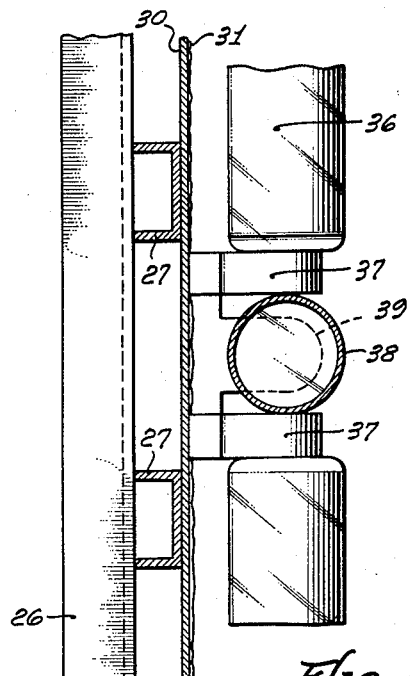
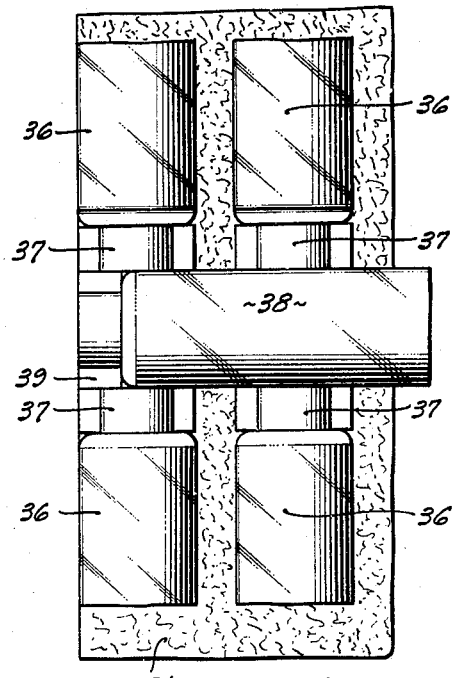
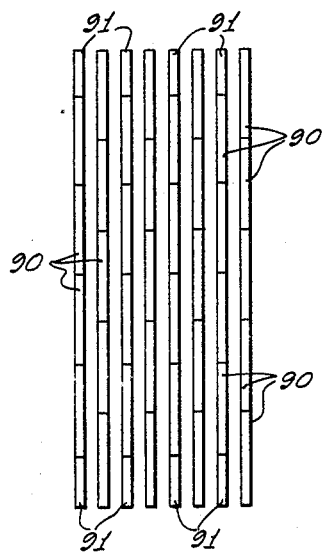
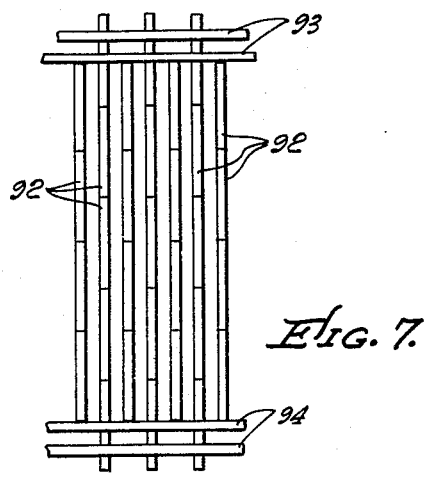

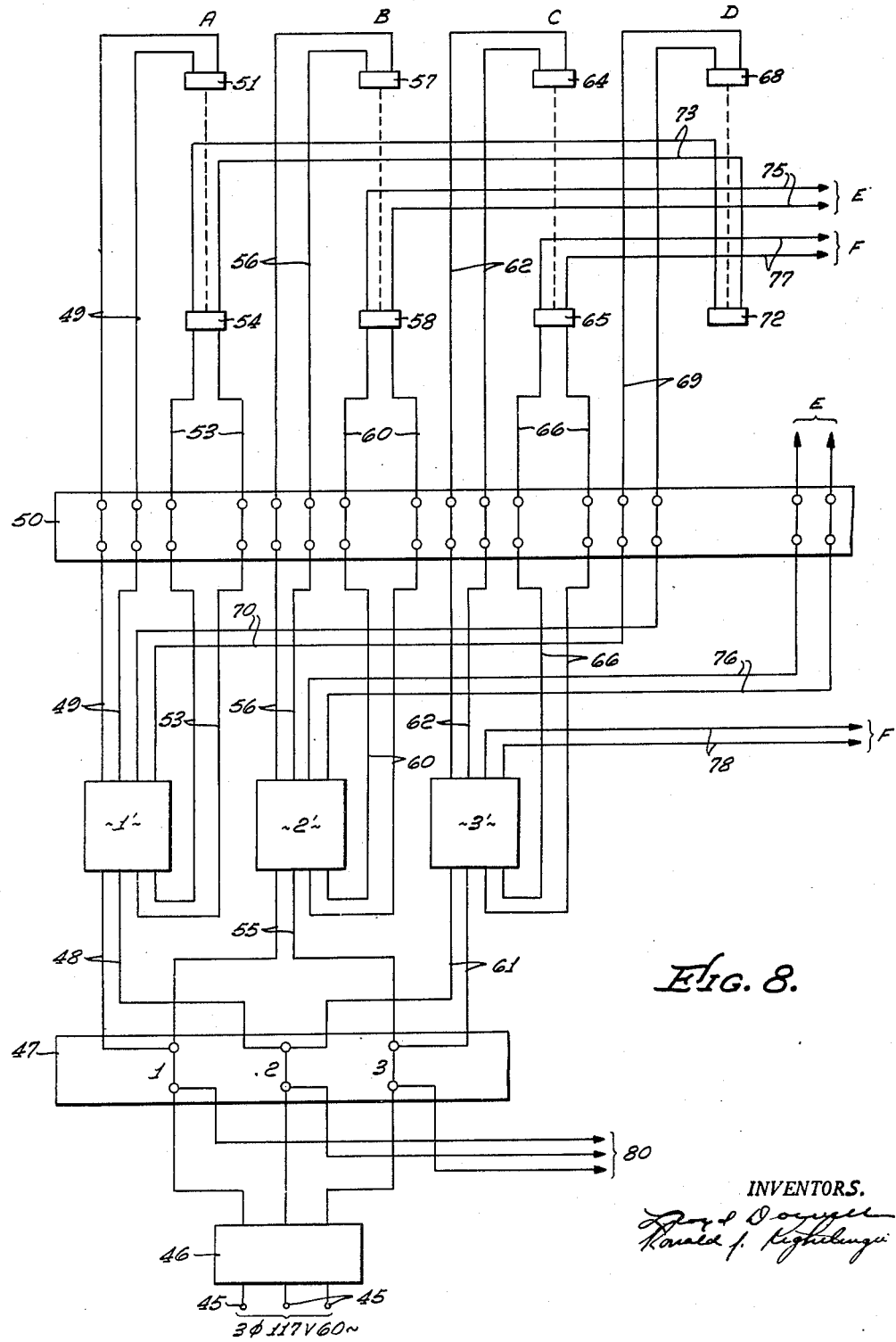

2,956,149

PHOTOGRAPHIC LIGHT SOURCE

Lloyd Dowell, Glendale, and Ronald J. Kightlinger, Van Nuys, Calif., assignors to Warner Bros. Pictures, Inc., Burbank, Calif., a corporation of Delaware Filed July 27, 1956, Ser. No. 600,420

11 Claims. (Cl. 240—1.3)

This invention relates to sources for producing light and particularly to a light source providing ultraviolet light.

In copending application, Serial No. 587,627, filed May 28, 1956, now U.S. Patent No. 2,870,672 issued January 27, 1959, assigned to the same assignee, a vertically arranged panel light source behind a background process screen was described in connection with a travelling mattee photographing process particularly applicable to color photography. The use of such a light source permitted better image definition and matte outline, and a higher speed in the photographing of travelling matte shots for color pictures. The present invention is directed to the structure and energization of such a light source.

This ultraviolet light source unit eliminates the use of a plurality of arc lamps using filters to eliminate the visible spectrum, as disclosed in U.S. Patent No. 2,651,233, of September 6, 1953. Arc lamps require considerable space behind the composite screen to collimate the light beams and obtain uniformity of illumination of the screen. Since the advent of large screens in motion picture production, a large number of such arc lamps are required to properly illuminate a large composite screen. Not only was it necessary to have considerable space behind the screen to accommodate the arc lamps, but they required a large amount of power, generated considerable heat, and were noisy. Furthermore, each light required an operator, which was expensive. The present unit requires only one operator regardless of the size of the unit.

One of the features of the present invention is the use of a panel in a vertical plane on which is mounted fluorescent tubing. Behind the tubing is crinkled aluminum or tin foil to diffuse the light and improve the uniformity of illumination of the screen. Each tube is coated with a filtering material to pass ultraviolet light having wavelengths substantially between 360 millimicrons and 400 millimicrons. The frame is mounted on wheels for movement about a stage which permits the light source to be moved toward and away from the screen to vary the brightness of illumination thereof. The tubes are energized from a three-phase source and are so disposed as to minimize the lack of inertia of a gas-filled lamp. That is, each adjacent tube is energized from one phase of the three-phase source.

The principal object of the invention, therefore, is to facilitate the illumination of a large process screen particularly with ultraviolet light.

Another object of the invention is to provide an improved light source for a screen used in composite and travelling matte photography.

A further object of the invention is to provide an improved ultraviolet light source which is economical to operate and requires a minimum of space.

The novel features which are believed to be characteristic of this invention, both as to the manner of its organization and the mode of its operation, will be better understood from the following description when read in conjunction with the accompanying drawings, in which:

Fig. 4 is a side detail view of the mounting of the fluorescent tubes taken along the line 4—4 of Fig. 3.

Fig. 5 is a front detail view of the tube mounting.

Fig. 6 is a view of a modification of the tube arrangement shown in Fig. 1.

Fig. 7 is a view of another modification of the tube arrangement shown in Fig. 6; and Fig. 8 is a circuit diagram showing how the fluorescent tubes are energized from a three-phase source.

Figure 1:
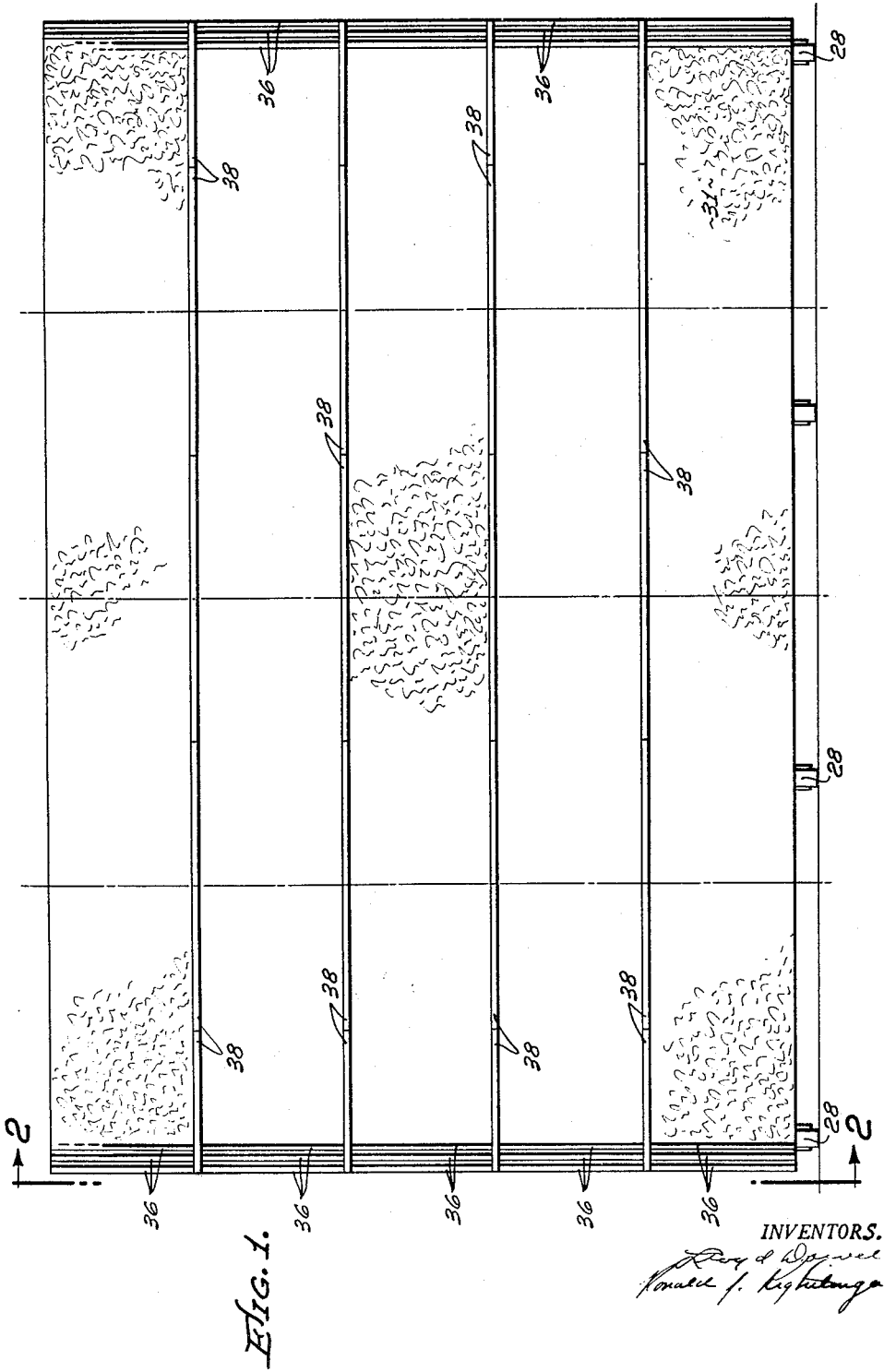
Fig. 1 is a front elevational view of a light source unit embodying the invention.
Figure 2:
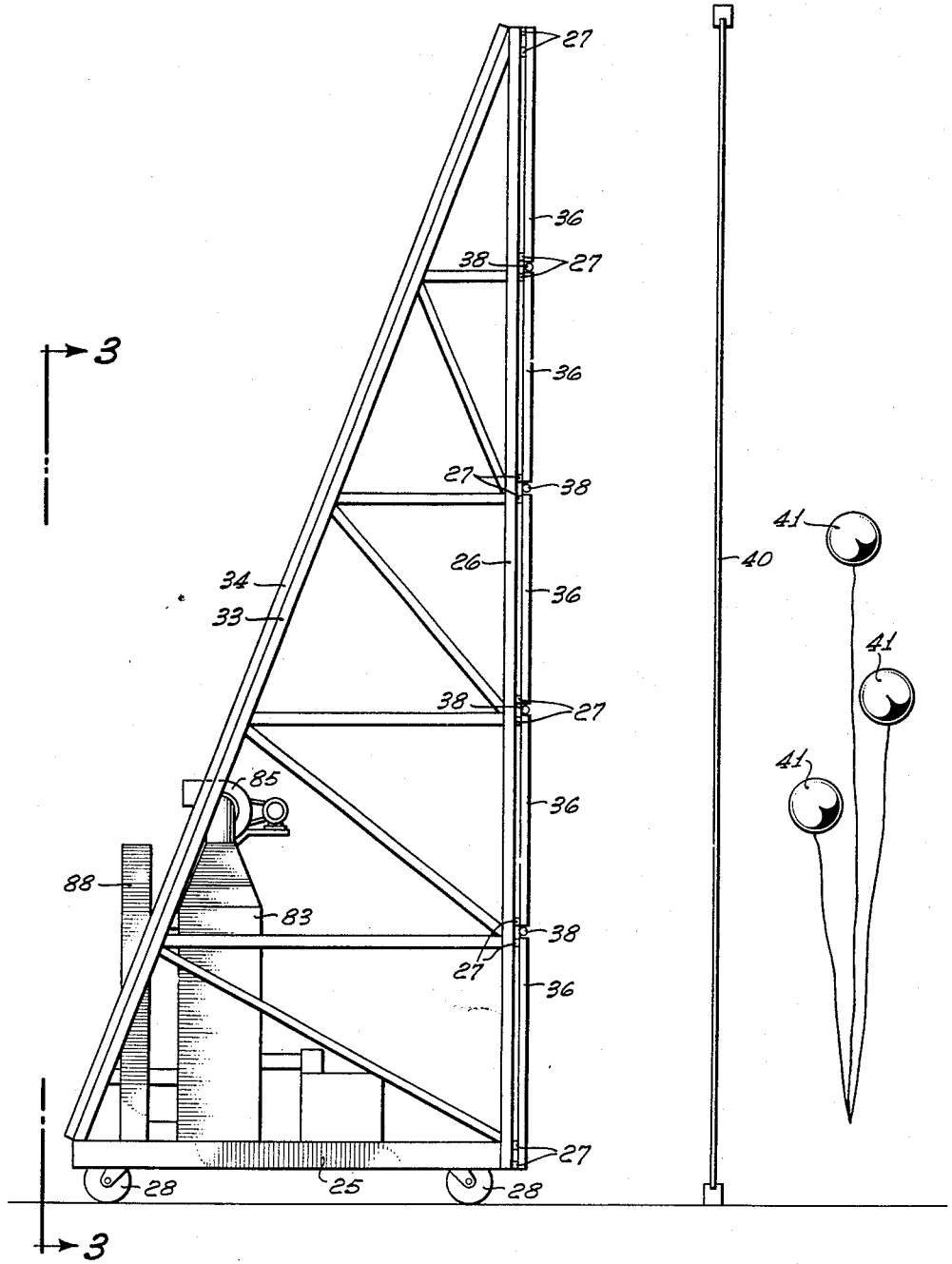
Fig. 2 is an end view of the light source unit taken along the line 2—2 of Fig. 1.

Referring now to the drawings in which the same reference numerals identify the same elements, a triangular frame having a base 25, vertical studs 26, and horizontal cross members 27 (see Fig. 4) is mounted on wheels 28. A panel 30 is attached in any suitable manner to the cross members 27, to which is attached crinkled aluminum or tin foil 31. The studs 26 and panel 30 are supported by angle iron bracing members 33 and 34. A plurality of fluorescent tubes 36 are mounted vertically in parallel rows of terminal sockets 37 (see Figs. 4 and 5). Between the rows of terminal sockets 37, horizontal tubes, such as shown at 38, are mounted end to end in terminal sockets such as shown at 39.

In Fig. 1, five rows of the vertical tubes 36 are illustrated, while four rows of tubes 38 are positioned end to end are shown between tubes 36. Although the horizontal rows of tubes are arranged vertically, they may also be positioned horizontally in vertical rows. As mentioned above, these tubes are of the type to provide ultraviolet light having wavelengths between approximately 360 millimicrons and 400 millimicrons, as disclosed in the above-mentioned copending application. As shown in Fig. 1, the tubes 36 are closely positioned adjacent one another, while tubes 38 fill in the spaces between the ends of tubes 36 to provide a uniform illumination of a background process screen 40 in front of which action is illustrated at 41.

Since uniform illumination of the screen 40 is particularly important, not only are the tubes arranged closely adjacent one another, but the tubes are energized in a manner to maintain their light output substantially constant. That is, since the tubes are of the fluorescent type, they have small inertia and tend to vary in intensity with the alternating voltage applied thereto. To reduce the effect of this variation in light output, the tubes are energized from a three-phase source connected to terminals 45 feeding a transformer 46 (see Fig. 8).

As indicated, the three phases, 1, 2, and 3, at terminal board 47, are connected to three tube starters, 1', 2', and 3'. Phase 1—2 is connected over conductors 48 to starter 1' and then over conductors 49 through terminal board 50 to terminal socket 51 for tube "A." Another output from the starter 1' is connected over conductors 53 through the terminal board 50 to tube socket 54 for tube "A." Phase 1—3 is connected over conductors 55 to starter 2' from which conductors 56 lead to tube socket 57 of tube "B." Tube socket 58 of tube "B" is connected over conductors 60 to starter 2'. Phase 2—3 is connected over conductors 61 to starter 3' and then over conductors 62 to socket 64 of tube "C." The other socket 65 of tube "C" is connected over conductors 66 to starter 3'. Thus, the peak illumination of tubes A, B, and C will occur 120 degrees apart when energized from the three-phase, 117-volt 60 cycle source, and the output light energy from the three tubes will be substantially uniform.

The next three tubes are connected in a similar manner, as shown by tube "D," where its socket 68 is connected over conductors 69 and conductors 70, to starter 1', while the other socket 72 of tube "D" is connected over conductors 73 and conductors 53 to starter 1'. Thus, the light intensity of tube "D" will follow the same cycle as tube "A." The next two tubes of the light source will be similarly connected as illustrated by conductors 75 and conductors 76 connected to starter 2' for tube "E" and conductors 77 and conductors 78 connected to starter 3' for tube "F." Since starters 1', 2', and 3' are limited to a certain number of tubes, other starters for other tube groups are connected to transformer 46 as indicated by terminals 80. Thus, the tubes are dispersed over the panel 30 in a manner to provide substantially a constant light intensity over its entire surface.

Figure 3:
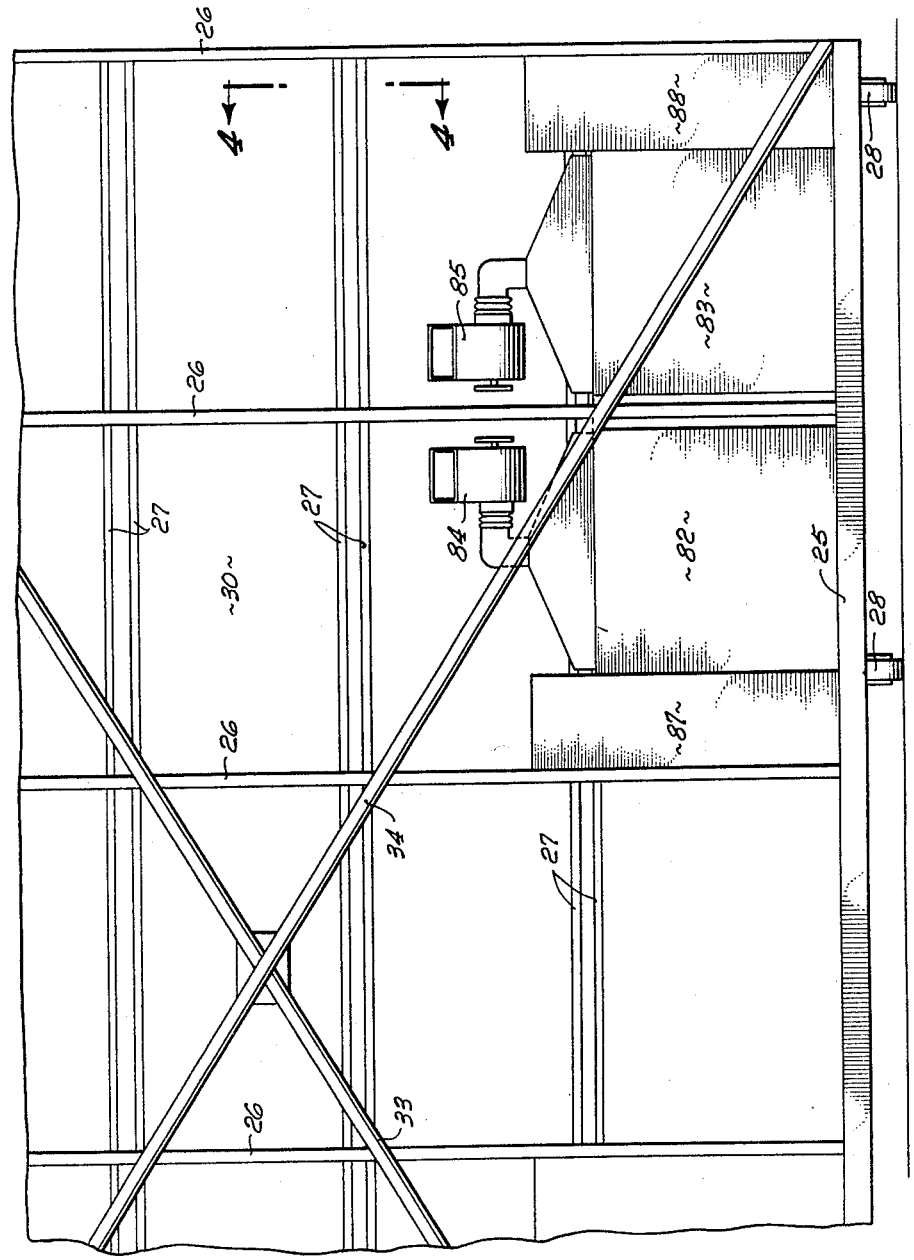
Fig. 3 is a rear elevational view of the light source unit taken along the line 3—3 of Fig. 2.

Referring to Fig. 3, the transformer starter units are housed in cabinets 82 and 83 which are provided with blowers 84 and 85, respectively, to maintain them at a desired operating temperature. Cabinets 87 and 88 house the terminal boards and power switches.

As mentioned above, uniform light output is essential, and Figs. 6 and 7 diagrammatically represent other tube arrangements for obtaining uniform illumination. Fig. 6 shows tubes 90 in staggered vertical positions, certain tubes 91 being half the length of tubes 90 to cover the panel. In this arrangement, no horizontally arranged tubes, such as 38, are required, the loss of light at the terminal socket between any two tubes being compensated for by the center of an adjacent tube. In Fig. 7, full length tubes 92 are used but the use of half length tubes is avoided by the horizontal tubes 93 at the top and horizontal tubes 94 at the bottom of the panel to maintain uniformity.

The above described light source, therefore, has many advantages over the arc lamp filter type of light source for the screen 40, as shown in the above-mentioned patent. For instance, the fluorescent tube light source requires less space behind the screen 40 since it is unnecessary to have a long projection throw for collimation of the light from the projecting arc lamps. Secondly, there is no noise or smoke produced and substantially no heat generated compared to that from arc lamps. The light source is more economical to operate from the standpoint of electrical energy required, and particularly from the standpoint of operators, since it is only necessary for a single operator to throw a switch to energize all the lamps, whereas when many arc lamps were required, an operator was provided for each lamp.

The frame may be built to any size to accommodate any particular large screen, and when smaller screens are used, the edges of the light source may be covered. Also, for exceptionally large screens, the frame may have a concave curvature, or be hinged into three sections, or be of three separate units so that the wing units may be tilted toward the ends of the screen to increase the illumination at the ends of the screen to provide the same exposure on a film centrally positioned in front of the screen. Furthermore, by the use of crinkly aluminum or tin foil immediately behind the lamps, the light is well diffused to aid in obtaining uniformity of illumination of the screen 40. The above described light source has improved the production of travelling matte photography, especially for color pictures.

We claim:

1. A light source comprising a triangular frame having a substantially horizontal base, studs extending from said base, and in a substantially vertical plane having a plurality of horizontal parallel arranged cross members and angle braces from said base to said studs, said frame being self-supporting, a solid panel attached to said cross members, said panel being substantially perpendicular to and extending from one edge of said base and fixed with respect to said base, a plurality of fluorescent light-emitting tubes mounted closely adjacent one another to cover the surface of said panel, light diffusing means attached to said panel between said panel and said tubes, and means for simultaneously energizing all of said tubes.

2. A light source in accordance with claim 1 in which said light diffusing means is crinkled foil.

3. A light source in accordance with claim 1 in which said last-mentioned means is a three-phase electrical power source, adjacent tubes being connected to adjacent phases of said power source.

4. A light source in accordance with claim 1 in which said last-mentioned means is a three-phase electrical power source, every fourth tube in said plurality of tubes on said panel being connected to the same phase of said power source.

5. A light source in accordance with claim 1 in which the major number of said tubes are positioned vertically, the remainder of said tubes being positioned horizontally between the ends of said vertically positioned tubes.

6. A light source in accordance with claim 1 in which said tubes are positioned with their axes vertical, the ends of one vertical row of said tubes being staggered between the ends of the adjacent rows of said tubes.

7. A light source in accordance with claim 6 in which certain tubes are horizontally positioned along the upper and lower portions of said panel.

8. A light source comprising a triangular frame having a substantially horizontal base, a substantially vertical panel and angle braces from said base to the top of said panel, said frame being self-supporting, said panel being fixed with respect to said base and substantially perpendicular to and extending from one edge of said base, light diffusing material on said panel, a plurality of horizontal rows of closely adjacent tube terminal sockets on said panel, a plurality of tubes mounted in said sockets and providing ultra-violet light, and means for simultaneously energizing said tubes from a three-phase electrical energy source.

9. A light source in accordance with claim 8 in which said tubes provide light having wavelengths between approximately 360 millimicrons and 400 millimicrons.

10. A light source in accordance with claim 8 in which said last-mentioned means is a three-phase electrical power source, said tubes being energized in groups of three, adjacent tubes in each group being connected to adjacent phases of said power source.

11. A light source in accordance with claim 8 in which said last-mentioned means is a three-phase electrical power source, every fourth tube in said plurality of tubes on said panel being connected to the same phase of said power source.

References Cited in the file of this patent

UNITED STATES PATENTS

| | | |
|---|---|---|
| 973,685 | Moore | Oct. 25, 1910 |
| 1,409,574 | Rasmussen | Mar. 14, 1922 |
| 2,010,849 | Dorgelo | Aug. 13, 1935 |
| 2,085,580 | Gottlieb et al. | June 29, 1937 |
| 2,221,890 | Williams | Nov. 19, 1940 |
| 2,228,691 | Crosser | Jan. 14, 1941 |
| 2,461,254 | Bassett | Feb. 8, 1949 |
| 2,565,110 | Adams | Aug. 21, 1951 |
| 2,632,096 | Kochale et al. | Mar. 17, 1953 |
| 2,683,798 | Craig | July 13, 1954 |